(12) United States Patent
Sankar et al.

(10) Patent No.: US 10,460,404 B2
(45) Date of Patent: Oct. 29, 2019

(54) DEVICES AND METHODS FOR ENERGY BENCHMARKING OF BUILDINGS

(71) Applicant: Tata Consultancy Services Limited, Mumbai (IN)

(72) Inventors: Maathangi Sankar, Chennai (IN); Venkataramakrishna P, Chennai (IN); Shiva R Iyer, Chennai (IN); Venkatesh Sarangan, Chennai (IN); Arunchandar Vasan, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/190,892

(22) Filed: Jun. 23, 2016

(65) Prior Publication Data

US 2016/0377664 A1   Dec. 29, 2016

(30) Foreign Application Priority Data

Jun. 26, 2015 (IN) .......................... 2460/MUM/2015

(51) Int. Cl.
*G06Q 50/06* (2012.01)
*G06Q 10/10* (2012.01)

(52) U.S. Cl.
CPC ............. *G06Q 50/06* (2013.01); *G06Q 10/10* (2013.01)

(58) Field of Classification Search
CPC .................................................. G06Q 50/06
USPC ......................................................... 702/60
See application file for complete search history.

(56) References Cited

U.S. PATENT DOCUMENTS

| 8,818,758 B1* | 8/2014 | Singh | G06F 21/81 |
| | | | 702/182 |
| 2010/0070102 A1* | 3/2010 | Benes | G06Q 30/02 |
| | | | 700/296 |
| 2011/0166913 A1* | 7/2011 | Buchanan | G06Q 10/06 |
| | | | 705/7.39 |
| 2012/0323382 A1* | 12/2012 | Kamel | G05F 1/66 |
| | | | 700/286 |
| 2013/0226546 A1* | 8/2013 | Suyeyasu | G06Q 50/08 |
| | | | 703/6 |
| 2014/0107851 A1 | 4/2014 | Yoon et al. | |
| 2014/0142904 A1* | 5/2014 | Drees | G06Q 10/04 |
| | | | 703/2 |

(Continued)

*Primary Examiner* — Ricky Ngon
(74) *Attorney, Agent, or Firm* — Finnegan, Henderson, Farabow, Garrett & Dunner LLP

(57) ABSTRACT

Devices and methods comprise determining an actual weather independent energy consumption value and actual weather dependent energy consumption value of a building. The devices and methods further comprise, obtaining energy simulation information from a data source. Further, an ideal weather independent energy consumption value and one or more ideal loads are generated based on the energy simulation information, building information, and total energy consumption of the building. The devices and methods further comprise determining a benchmarking score for the building using the actual weather independent energy consumption value, the actual weather dependent energy consumption value, the ideal weather independent energy consumption value, and the one or more ideal loads for managing energy consumption associated with the building.

9 Claims, 2 Drawing Sheets

(56) References Cited

U.S. PATENT DOCUMENTS

| | | | | |
|---|---|---|---|---|
| 2014/0278264 A1* | 9/2014 | Bukhin | ............... | G06F 17/5004 703/1 |
| 2015/0332294 A1* | 11/2015 | Albert | ................ | G06Q 30/0202 705/7.31 |
| 2016/0018835 A1* | 1/2016 | Gaasch | ..................... | G05F 1/66 700/291 |
| 2016/0334122 A1* | 11/2016 | Shiel | .................... | F24F 11/0001 |

* cited by examiner

DEVICES AND METHODS FOR ENERGY BENCHMARKING OF BUILDINGS

PRIORITY CLAIM

The present application also claims benefit from Indian provisional Patent Application No. 2460/MUM/2015, filed on Jun. 26, 2015, the entirety of which is hereby incorporated by reference.

TECHNICAL FIELD

The present subject matter relates, in general, to energy benchmarking and, particularly, but not exclusively, to energy benchmarking of buildings.

BACKGROUND

Energy benchmarking of buildings is performed to determine efficiency of energy consumption associated with the buildings. A building may be energy benchmarked based on several parameters, such as a type of the building, a size of the building, ambient weather conditions associated with the building, total energy consumption of the building, and a geographical location of the building. Based on the parameters, a score or a rating indicating the efficiency of energy consumption may be assigned to the building.

SUMMARY

Devices and Methods are described that enable energy benchmarking of buildings. Taking the building geometry, the hours of building occupation and the number of people occupying the building at a given time are some of the variables taken into consideration while energy benchmarking the buildings.

In an aspect, there is provided a method for energy benchmarking of a building that may include determining an actual weather independent energy consumption value and an actual weather dependent energy consumption value for the building, wherein the actual weather independent energy consumption value represents energy consumption by one or more devices present in the building operating independently of weather of an environment in the vicinity of the building, and wherein the actual weather dependent energy consumption value represents energy consumption by the one or more devices present in the building operating in correlation to the weather; obtaining energy simulation information corresponding to the building from a data source; generating an ideal weather independent energy consumption value and one or more ideal loads based on the obtained energy simulation information, building information, and total actual energy consumption of the building; and determining a benchmarking score for the building using the actual weather independent energy consumption value, the actual weather dependent energy consumption value, the ideal weather independent energy consumption value, and the one or more ideal loads for managing energy consumption associated with the building, wherein the benchmarking score is used for determining efficiency of energy consumption of the building.

In another aspect, there is provided a device for energy benchmarking of a building comprising: a processor, an analysis module coupled to the processor to: determine an actual weather independent energy consumption value and an actual weather dependent energy consumption value for a building, wherein the actual weather independent energy consumption value represents energy consumption by one or more devices present in the building operating independently of weather of an environment in the vicinity of the building, and wherein the actual weather dependent energy consumption value represents energy consumption by the one or more devices present in the building operating in correlation to the weather; and obtain energy simulation information corresponding to the building from a data source; a benchmarking module (114) coupled to the processor (102) to: generate an ideal weather independent energy consumption value and one or more ideal loads based on the obtained energy simulation information, building information, and total actual energy consumption of the building; and determine a benchmarking score for the building using the actual weather independent energy consumption value, the actual weather dependent energy consumption value, the ideal weather independent energy consumption value, and the one or more ideal loads for managing energy consumption associated with the building, wherein the benchmarking score is used for determining efficiency of energy consumption of the building.

BRIEF DESCRIPTION OF DRAWINGS

The embodiments herein will be better understood from the following detailed description with reference to the drawings, in which.

Figure 1:
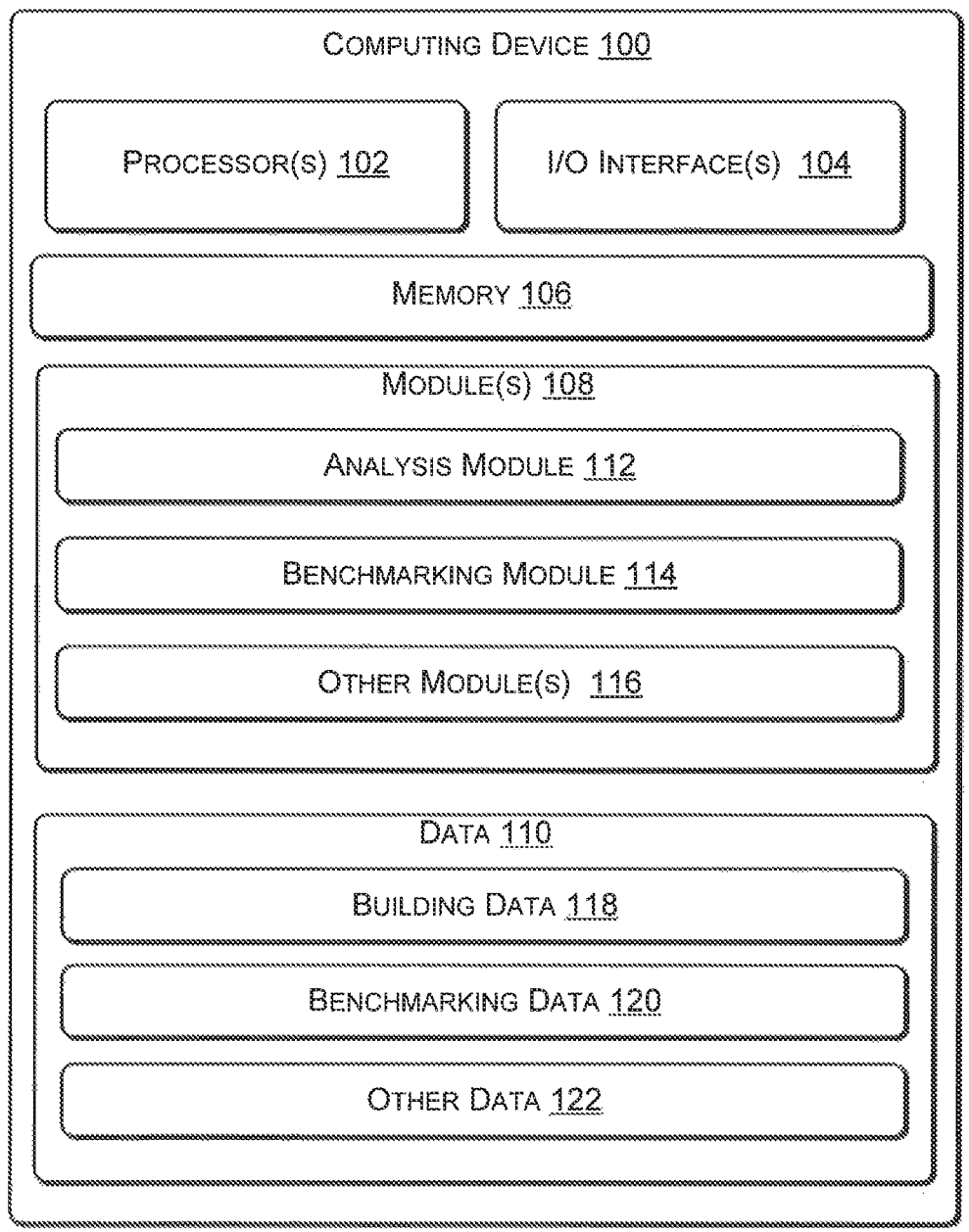
FIG. 1 illustrates a computing device for energy benchmarking buildings, in accordance with an implementation of the present subject matter.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Buildings are energy benchmarked in order to determine the efficiency of energy consumption associated with buildings. The buildings may be energy benchmarked based on a plurality of parameters, for example, building type, building size, ambient weather condition of the building, total energy consumption, and geographic location. Based on the aforementioned parameters, a ranking or a score indicative of efficiency of energy consumption associated with the building may be determined. Accordingly, one or more measures for improving the ranking or score associated with the building and thereby, the efficiency of energy consumption may be implemented.

In a conventionally known approach for energy benchmarking of buildings, energy use intensity (EUI) for the building may be determined. The EUI indicates the energy use per year per area of the building. As may be gathered, the EUI of the building is based on the size of the building and does not take into account other parameters, such as operational hours associated with the building. Thus, the EUI may not reflect a true measure of efficiency of energy consumption associated with the building.

In another conventionally known approach, a group of buildings having similar attributes may be ranked based on building energy data corresponding to the buildings. The building energy data includes information, for example, the parameters associated with each of the buildings. In said approach, based on the total energy consumption of a building and the average energy consumption of the buildings, a ranking for the building may be determined. However, as the ranking of the building is determined relative to the other buildings present in the group, the ranking may not reflect a true measure of efficiency of energy consumption associated with the building. For instance, in a case where a group comprising buildings having low efficiency of energy consumption are to be rated, a building may be ranked higher despite having low efficiency of energy consumption as the ranking is relative to other such buildings present in the group.

In yet another approach for energy benchmarking of buildings, the buildings may be benchmarked based on their corresponding energy consumption. For determining the energy consumption of a building, a model for the building may be defined based on parameters corresponding to the building. For determining the energy consumption of the building, information associated with heating, ventilation, and air conditioning (HVAC) systems of the building may be provided as input to the model and one or more simulations may be performed. However owing to factors, such as geographic location, monetary constraints, operational hours, and variance in number of individuals present in the building, such information may have to be manually gathered from each of the buildings being benchmarked which may prove to be a cumbersome task.

The present subject matter describes systems and methods for energy benchmarking of buildings. In accordance with the present subject matter, benchmarking of buildings may be performed independent of information about the HVAC systems associated with the buildings. As a result, the buildings may be energy benchmarked with greater accuracy.

For energy benchmarking of a building, in an implementation, actual weather independent energy consumption value and actual weather dependent energy consumption value associated with the building may be obtained. The actual weather independent energy consumption value represents energy consumption by devices present in the building operating independent of an environment in the vicinity of the building. The devices operating independent of the weather may hereinafter also be referred to as weather independent devices. Examples of the weather independent devices may include, but are not limited to, light bulbs, computers, laptops, printers, fax machines, routers, projectors, security systems installed in the building, local servers installed within the building, and the like. The actual weather dependent energy consumption value represents energy consumption by devices present in the building operating in correlation to the weather. The devices which operate in correlation to the weather may hereinafter be referred to as weather dependent devices. Examples of the weather dependent devices ay include, but are not limited to, refrigerator, air conditioner, ventilator, thermal insulation setup of the building, fans, and the like.

In an example, the actual weather independent energy consumption value and the weather dependent energy consumption data may be obtained using the actual total energy consumption data of the building and building information associated with the building. The actual total energy consumption data of the building may be obtained from devices, such as meter logs. The building information may include information such as, a size of the building, an operation schedule indicating time duration of occupancy of the building, a head count of individuals present in the building, a location of the building, and an estimate temperature associated with the location of the building. In another example, other conventional techniques for determining the actual weather independent energy consumption value and the weather dependent energy consumption data may be implemented.

Continuing with the present implementation, energy simulation information corresponding to the building may be obtained based on a class of the building. The energy simulation information may include data related to one or more building attributes, such as building shell, layout and thermal zoning, operational hours of the building, activities carried out in the building, type of interiors of the building, and energy load intensities of energy loads installed at various locations inside the building premises.

Based on the energy simulation information, building information, and total energy consumption of the building, ideal weather independent energy consumption value and one or more ideal loads may be generated. In an example, a known conventional simulator may be used for determining the ideal weather independent energy consumption value and the ideal loads. The ideal loads may indicate load corresponding to systems and devices present in the building. Depending upon a type of the device, the corresponding ideal load may be one of an ideal heating load or an ideal cooling load. For instance, for an air conditioner, ideal cooling load may be generated. While, for a heater, ideal heating load may be generated. As may be gathered, the benchmarking is performed independent of the data associated with the HVAC systems. As a result, the complexity associated with obtaining such information is averted.

Subsequently, a benchmarking score indicative of efficiency of energy consumption for the building may be determined using the actual weather independent energy consumption, the actual weather dependent energy consumption, the ideal weather independent energy consumption value, and the one or more ideal loads. In an example, the benchmarking score may be in the form of a two dimensional tuple comprising a ratio of the actual weather independent energy consumption to ideal weather independent energy consumption value and a ratio of the actual weather dependent energy consumption to the ideal load.

As the energy consumption of a building may be determined independent of information associated with the HVAC systems of the building, the ease and efficacy of obtaining the energy consumption of buildings may increase. Further, the present subject matter facilitates determination of the energy consumption in a case where limited data associated with the buildings is available. Additionally, multidimensional benchmarking of the budding facilitates in determining a type of the devices, i.e., weather dependent or weather independent, affecting the efficiency of energy consumption. Accordingly, suitable measure for improving the energy consumption of the building may be implemented.

These and other advantages of the present subject matter would be described in greater detail in conjunction with the following figures. While aspects of described systems and methods can be implemented in any number of different computing systems, environments, and/or configurations, the embodiments are described in the context of the following device(s).

FIG. 1 illustrates a computing device 100 for energy benchmarking of buildings. In an example, the computing device 100 may be a central server, a mainframe computer, a workstation computer, a desktop computer, a laptop, and a smart phone. In an example, the computing device 100 may be deployed for energy benchmarking a plurality of buildings, such as, enterprise buildings, school buildings, storage facilities, data centers, and the like.

In an implementation, the computing device 100 may include one or more processor(s) 102, I/O interfaces 104, and a memory 106 coupled to the processor 102. The processor 102 can be a single processing unit or a number of units, all of which could include multiple computing units. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

The I/O interfaces 104 may include a variety of software and hardware interfaces, for example, interfaces for peripheral device(s), such as a keyboard, a mouse, a display unit, an external memory, and a printer. Further, the I/O interfaces 104 may enable the computing device 100 to communicate with other devices, such as web servers and external databases. The I/O interfaces 104 can facilitate multiple communications within a wide variety of networks and protocol types, including wired networks, for example, local area network (LAN), cable, etc., and wireless networks, such as Wireless LAN (LAN), cellular, or satellite. For the purpose, the I/O interfaces 104 include one or more ports for connecting a number of computing systems with one another or to a network.

The memory 106 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the computing device 100 also includes module(s) 108 and data 110.

The module(s) 108, amongst other things, include routines, programs, objects, components, data structures, etc., which perform particular tasks or implement data types. The module(s) 108 may also be implemented as, signal processor(s), state machine(s), logic circuitries, and/or any other device or component that manipulate signals based on operational instructions.

Further, the module(s) 108 can be implemented in hardware, instructions executed by a processing unit, or by a combination thereof. The processing unit can comprise a computer, a processor, such as the processor 102, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 108 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In one implementation, the module(s) 108 further includes an analysis module 112, a benchmarking module 114, and other module(s) 116. The other modules 116 may include programs or coded instructions that supplement applications and functions of the computing device 100.

The data 110 serves, amongst other things, as a repository for storing data processed, received, and generated by one or more of the module(s) 108. The data 110 includes budding data 118, benchmarking data 120, and other data 122. The other data 122 includes data generated as a result of the execution of one or more modules in the module(s) 108.

In operation, for energy benchmarking of a building, the analysis module 112 may determine actual weather independent energy consumption and actual weather dependent energy consumption of a building. The actual weather independent energy consumption may be understood as a sum total of the energy consumption due to weather independent devices present in the building. The actual weather dependent energy consumption may be understood as sum total of energy consumption due to weather dependent devices present in the building.

In an example, the analysis module 112 may determine the actual weather independent energy consumption value and the actual weather dependent energy consumption value based on total actual energy consumption data and building information associated with the building. The analysis module 112 may obtain the total actual energy consumption data of the building from devices, such as meter logs, of the building. In another example, the analysis module 112 may obtain the total actual energy consumption data from a data source, such as a database, a data repository, and unstructured data source, over a communication network (not shown in the figure). In yet another example, the analysis module 112 may obtain the total actual energy consumption data from a data storage device, such as a memory stick, an external hard disk, and the like.

The building information may include information such as, a size, an operation schedule, a number of individuals, and ambient weather information, associated with the building. The size may indicate the area covered by the building. The operation schedule may indicate a time duration for which the building is occupied for operational purposes. The head count may indicate number of individuals present in the building during operation schedule. The ambient weather may indicate a temperature associated with a location of the building. In an example, the analysis module 112 may obtain the building information from an external data source over a communication network. In another example, the building information may be stored in the building data 118. In said example, the analysis module 112 may obtain the building information from the building data 118. On obtaining the total actual energy consumption data and the building information, the analysis module 112 may determine the actual weather independent energy consumption value and the actual weather dependent energy consumption value of a building based on the total actual energy consumption of the building and the building information. In another example, the analysis module 112 may determine the actual weather independent energy consumption value and the actual weather dependent energy consumption value using known conventional techniques.

Thereafter, the analysis module 112 may obtain energy simulation information corresponding to the building from a data source based on a class of the building. The energy simulation information may include information corresponding to one or more building attributes based on which ideal energy consumption of the building may be simulated. For instance, the energy simulation information may include information, such as building shell, layout and thermal zoning, activities, interior equipment, and typical energy load intensities. The building shell may include information about interior and exterior walls, exterior glazing, roof, public spaces, and electrical and mechanical systems present in the building. The layout and thermal zoning may indicate an interior layout of the building along with information about the different zones present in the building. The activities indicate zone specific information pertaining to typical levels of people activity. The typical energy load intensities comprise typical wattage rating for all types of equipment present in the buildings. In an example, the building information stored in the building data 118 may comprise the energy simulation information. In said example, the analysis module 112 may obtain the energy simulation information from the building data 118.

In an example, the analysis module 112 may determine the class of the building based on the building information and one or more predetermined criteria. The predetermined criteria may be based on factors such as the size of the building and the location of the building. For instance, for a building having area twenty five hundred square meters and a temperature of a location equal to twenty two degrees may be classified as class A building. The class A may indicate a building of high standard having high values of all the parameters included in the building information. In another example, the analysis module 112 may determine the class of the building based on a user input received by the computing device 100. The user input may be provided by an individual, such as an administrator seeking to energy benchmark the buildings.

On determining the class of the building, the analysis module 112 may access a look up table stored in an internal database. The look up table may include a plurality of building classes and corresponding building energy simulation information. Based on the class of the building, the analysis module 112 may analyze the look up table to obtain energy simulation information corresponding to the class of the building.

In an implementation, the benchmarking module 114 may generate ideal weather independent energy consumption value and one or more ideal loads based on the energy simulation information, building information, and the total actual energy consumption data of the building. The ideal weather independent energy consumption value may be understood energy consumption by weather independent devices when operated under optimal or ideal working conditions. The ideal loads may include a load corresponding to the systems installed in the building. For instance, the benchmarking module 114 may generate an ideal heating load for a device, say, a thermal insulation setup. In an example, the benchmarking module 114 may compute the ideal weather independent energy consumption value and the ideal loads using a known conventional simulator. In said example, the benchmarking module 114 may provide the energy simulation information, the building information, and total actual energy consumption data of the building as input to the simulator and may obtain the ideal weather independent energy consumption value and the ideal loads as an output. The benchmarking module 114 may store the ideal weather independent energy consumption value and the ideal loads in the benchmarking data 120.

In an example, the benchmarking module 114 may determine a benchmarking score of the building based on the actual weather independent energy consumption value, the actual weather dependent energy consumption value, the ideal weather independent energy consumption value, and the one or more ideal loads. In said example, the benchmarking module 114 may determine a ratio based on the actual weather independent energy consumption value and the ideal weather independent energy consumption value. Further, the benchmarking module 114 may determine a ratio based on the actual weather dependent energy consumption value and the ideal loads. In an example, the benchmarking score may be in the form of a two dimension tuple comprising the aforementioned ratios. The benchmarking module 114 may store the benchmarking score of the budding in the benchmarking data 120.

As may be understood, the benchmarking score for each of the buildings may be determined in a manner as described above. Subsequently, the benchmarking scores may be used for comparing the efficiency of energy consumption of the buildings. Further, as the benchmarking score is in the form a two dimension tuple, the dimensions being, weather dependent and weather independent, identification of devices which affect the energy consumption may be identified easily. Accordingly, one or more measures for optimizing the benchmarking scores may be taken.

Figure 2:
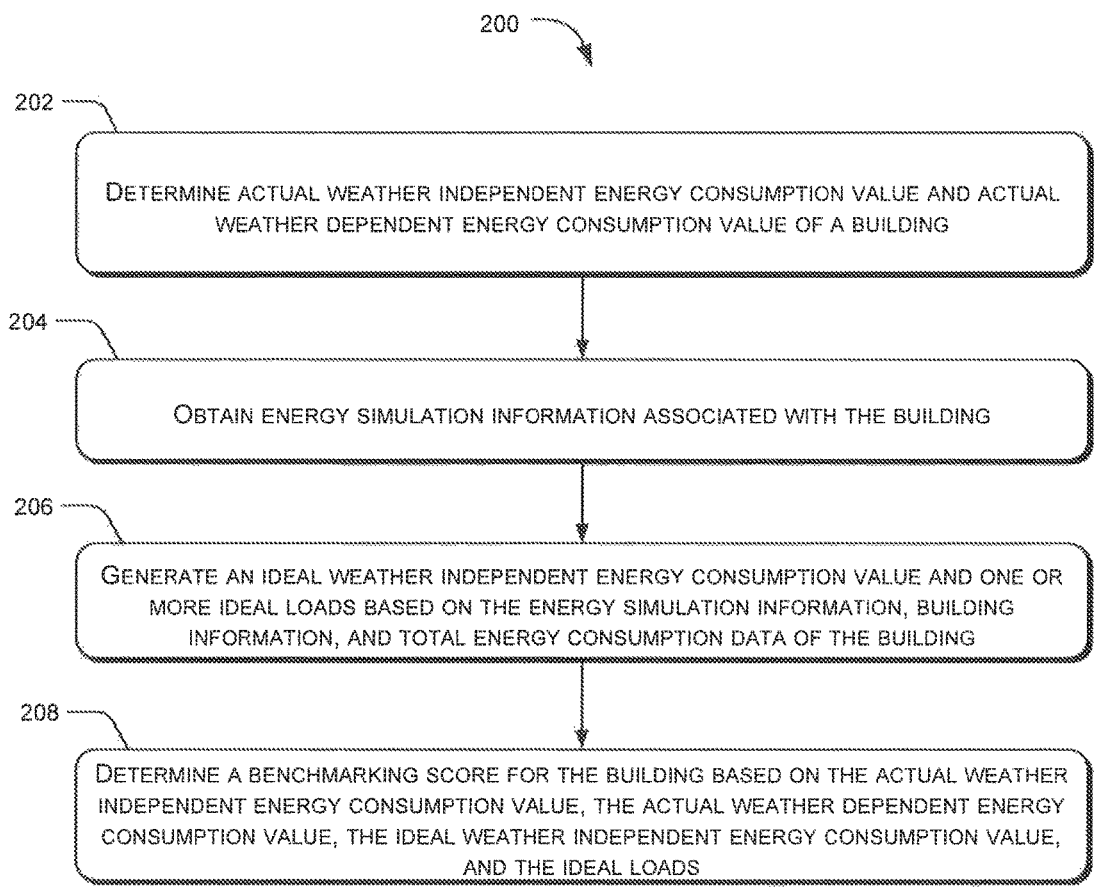
FIG. 2 illustrates a method for energy benchmarking buildings, in accordance with an implementation of the present subject matter.

FIG. 2 illustrates a method 200 for energy benchmarking buildings, according to an embodiment of the present subject matter. The order in which the method 200 is described is not intended to be construed as a limitation, and any number of the described method blocks can be combined in any order to implement the method or any alternative methods. Additionally, individual blocks may be deleted from the method without departing from the spirit and scope of the subject matter described herein. Furthermore, the method can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

In an implementation, one or more of the method described herein may be implemented at least in part as instructions embodied in a non-transitory computer-readable medium and executable by one or more computing devices, In general, a processor, for example, a microprocessor, receives instructions from a non-transitory computer-readable medium, for example, a memory, and executes those instructions, thereby performing one or more method, including one or more of the method described herein. Such instructions may be stored and/or transmitted using any of a variety of known computer-readable media.

Referring to FIG. 2, at block 202, actual weather independent energy consumption value and actual weather dependent energy consumption value of a building are obtained. In an example, the actual weather independent energy consumption value and the actual weather dependent energy consumption value of the building may be determined based on total actual energy consumption of the building and the building information associated with the building. In an example, the total actual energy consumption of the building may be obtained from a meter log of the budding. The building information, in an example, may include, a size, a location, an area, weather, operation schedule, and head count associated with the building. In an example, the analysis module 112 may determine the actual weather independent energy consumption value and actual weather dependent energy consumption value of a building.

At block 204, energy simulation information associated with the building is obtained from a data source. The energy simulation information may include information associated with one or more building attributes, such as, building shell, layout and thermal zoning, activities, interior equipment, and typical energy load intensities. In an example, the energy simulation information may be obtained based on a class of the building. The class of the building may be based on one or more characteristics associated with the building. For instance, the class of the building may be based on a size and a location of the building. In an implementation, the analysis module 112 may obtain the energy simulation information.

At block 206, ideal weather independent energy consumption value and one or more ideal loads are generated using the energy simulation information, building information, and total actual energy consumption data of the building. In an example, the building information, the total actual energy consumption data, and the energy simulation information may be provided as input to a simulator for generating the ideal weather independent energy consumption value and the ideal loads. The ideal loads comprise one or more ideal heating or cooling loads corresponding to the devices or systems present in the building. On receiving the input, the simulator may generate the ideal weather independent energy consumption value and the ideal temperature values as an output. In an example, the benchmarking module 114 may generate the ideal weather independent energy consumption value and the ideal loads.

At block 208, a benchmarking score for the budding is determined based on the actual weather independent energy consumption value, the actual weather dependent energy consumption value, the ideal weather independent energy consumption value, and the ideal loads. In an example, the benchmarking score may comprise a ratio based on the actual weather independent energy consumption value and the ideal weather independent energy consumption value and, a ratio based on the actual weather dependent energy consumption value and the ideal loads. The benchmarking score, in an example, may be in the form of a tuple comprising the aforementioned ratios. The benchmarking score may be used for managing energy consumption associated with the building. For instance, the benchmarking score may be used to compare the energy consumption of the building with other buildings. In another example, the benchmarking score may be analyzed for identifying one or more systems that may increase the energy consumption of the building. Accordingly, measures for reducing the energy consumption may be implemented. In an implementation, the benchmarking module 114 may determine the benchmarking score.

Although implementations for methods and systems for energy benchmarking are described, it is to be understood that the present subject matter is not necessarily limited to the specific features or methods described. Rather, the specific features and methods are disclosed as implementations for energy benchmarking.

We claim:

1. A method for energy benchmarking of a building, the method comprising:
    determining an actual weather independent energy consumption value and an actual weather dependent energy consumption value for the building based on actual energy consumption data and building information, wherein the actual weather independent energy consumption value represents energy consumption by one or more devices present in the building operating independently of weather of an environment in the vicinity of the building, and wherein the actual weather dependent energy consumption value represents energy consumption by the one or more devices present in the building operating in correlation to the weather;
    obtaining energy simulation information corresponding to the building from a data source, and wherein the energy simulation information comprises information indicative of building attributes including building shell, layout and thermal zoning, operational hours of the building, activities carried out in the building, type of interiors of the building, and energy load intensities of energy loads installed at multiple locations inside building premises;
    generating an ideal weather independent energy consumption value and one or more ideal loads based on the obtained energy simulation information, building information, and total actual energy consumption of the building; and
    determining a benchmarking score for the building using the actual weather independent energy consumption value, the actual weather dependent energy consumption value, the ideal weather independent energy consumption value, and the one or more ideal loads for managing energy consumption associated with the building, wherein the benchmarking score is used for determining efficiency of energy consumption of the building and wherein the benchmarking score is a two-dimensional tuple comprising a ratio based on the actual weather independent energy consumption value to the ideal weather independent energy consumption value and, a ratio based on the actual weather dependent energy consumption value to the ideal loads.

2. The method as claimed in claim 1, wherein the energy simulation information is obtained based on a class of the building.

3. The method as claimed in claim 2, wherein the obtaining the energy simulation information comprises:
    determining the class of the building based on one or more characteristics associated with the building;
    accessing a look up table comprising a plurality of building classes and corresponding energy simulation information; and
    identifying the energy simulation information corresponding to the class of the building using the look up table.

4. The method as claimed in claim 3, wherein the class of the building is determined based on one of a user input and building information.

5. A computing device for energy benchmarking of a building, the computing device comprising:
a processor; and
an analysis module coupled to the processor to,
determine an actual weather independent energy consumption value and an actual weather dependent energy consumption value for a building based on actual energy consumption data and building information, wherein the actual weather independent energy consumption value represents energy consumption by one or more devices present in the building operating independently of weather of an environment in the vicinity of the building, and wherein the actual weather dependent energy consumption value represents energy consumption by the one or more devices present in the building operating in correlation to the weather; and
obtain energy simulation information corresponding to the building from a data source, and wherein the energy simulation information comprises information indicative of building attributes including building shell, layout and thermal zoning, operational hours of the building, activities carried out in the building, type of interiors of the building, and energy load intensities of energy loads installed at multiple locations inside building premises; and
a benchmarking module coupled to the processor to,
generate an ideal weather independent energy consumption value and one or more ideal loads based on the obtained energy simulation information, building information, and total actual energy consumption of the building; and
determine a benchmarking score for the building using the actual weather independent energy consumption value, the actual weather dependent energy consumption value, the ideal weather independent energy consumption value, and the one or more ideal loads for managing energy consumption associated with the building, wherein the benchmarking score is used for determining efficiency of energy consumption of the building and wherein the benchmarking score is a two-dimensional tuple comprising a ratio of the actual weather independent energy consumption value to the ideal weather independent energy consumption value and, a ratio of the actual weather dependent energy consumption value to the ideal loads.

6. The computing device as claimed in claim 5, wherein the energy simulation information is obtained based on a class of the building.

7. The computing device as claimed in claim 6, wherein the analysis module further is to, determine the class of the building; access a look up table stored in the data source, wherein the look up table comprises a plurality of budding classes and corresponding energy simulation information; and identify energy simulation information corresponding to the class of the budding using on the look up table.

8. The computing device as claimed in claim 7, wherein the analysis module further is to, determine the class of the building based on one of a user input and building information.

9. A non-transitory computer-readable medium having embodied thereon a computer program for executing a method comprising:
determining an actual weather independent energy consumption value and an actual weather dependent energy consumption value for a building based on actual energy consumption data and building information, wherein the actual weather independent energy consumption value represents energy consumption by one or more devices present in the building operating independently of weather of an environment in the vicinity of the building, and wherein the actual weather dependent energy consumption value represents energy consumption by the one or more devices present in the building operating in correlation to the weather;
obtaining energy simulation information corresponding to the building from a data source, and wherein the energy simulation information comprises information indicative of building attributes including building shell, layout and thermal zoning, operational hours of the building, activities carried out in the building, type of interiors of the building, and energy load intensities of energy loads installed at multiple locations inside building premises;
generating an ideal weather independent energy consumption value and one or more ideal loads based on the obtained energy simulation information, building information, and total actual energy consumption of the building; and
determining a benchmarking score for the building using the actual weather independent energy consumption value, the actual weather dependent energy consumption value, the ideal weather independent energy consumption value, and the one or more ideal loads, wherein the benchmarking score is used for determining efficiency of energy consumption of the building and wherein the benchmarking score is a two-dimensional tuple comprising a ratio of the actual weather independent energy consumption value to the ideal weather independent energy consumption value and, a ratio of the actual weather dependent energy consumption value to the ideal loads.

* * * * *